April 28, 1925.
G. E. SAVAGE ET AL
1,535,864
BOTTLE HOLDER FOR VACUUM JARS OR SIMILAR ARTICLES
Filed July 31, 1923
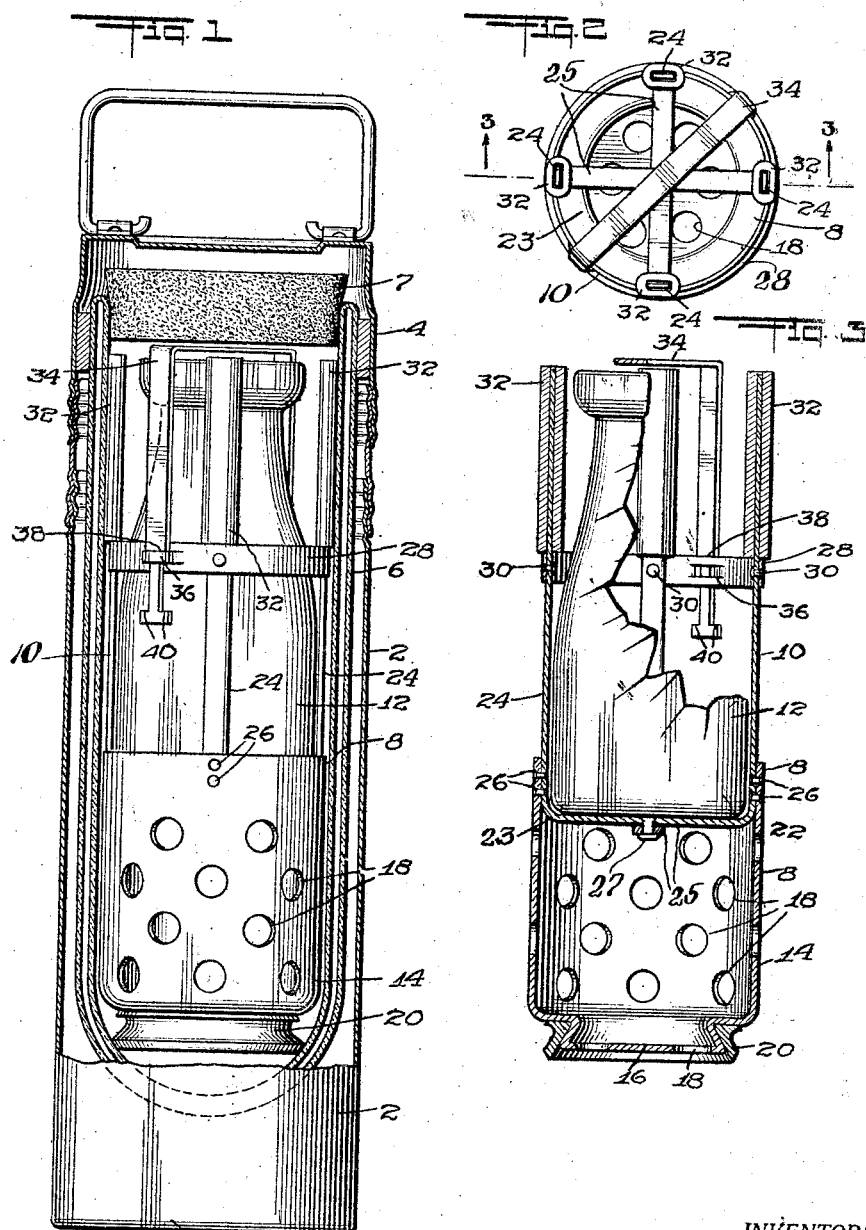
INVENTORS
G. E. Savage
L. H. Wilkinson
BY
Bartlett & Brownell
ATTORNEYS Patented Apr. 28, 1925.

1,535,864

UNITED STATES PATENT OFFICE.

GEORGE E. SAVAGE AND LOUIS H. WILKINSON, OF MERIDEN, CONNECTICUT, ASSIGNORS TO MANNING, BOWMAN & COMPANY, OF MERIDEN, CONNECTICUT, A CORPORATION OF CONNECTICUT.

BOTTLE HOLDER FOR VACUUM JARS OR SIMILAR ARTICLES.

Application filed July 31, 1923. Serial No. 654,842.

*To all whom it may concern:*

Be it known that we, GEORGE E. SAVAGE and LOUIS H. WILKINSON, citizens of the United States, residing at Meriden, county of New Haven, State of Connecticut, have invented a certain new and useful Improvement in Bottle Holders for Vacuum Jars or Similar Articles, of which the following is a full, clear, and exact description.

Our invention relates to devices for holding milk bottles, nursing bottles or similar articles in a vacuum jar or similar container.

An object of the invention is to provide a device of this character having provision for cooling the interior of said container when the device is placed therein, so that previous cooling of the contents of the bottle or other article held thereby is unnecessary.

Another object of the invention is to provide a practical and efficient device of the character above indicated, which may be easily placed in and removed from a vacuum jar or similar container; in which the article may be easily placed and removed; and in which the article is securely held and the interior of the container is protected from injury due to shock or jar when the device is within the container.

The following is a description of our invention, reference being had to the accompanying drawings, in which,—

Figure 1 is a longitudinal sectional view, partly in elevation, of a vacuum jar and a device therein embodying the features of the invention in their preferred form, the device being shown as holding a cream or milk bottle;

Fig. 2 is a plan view of said device removed from the vacuum jar; and

Fig. 3 is a longitudinal sectional view, partly in elevation, of said device removed from the vacuum jar and showing a portion of a milk bottle placed therein.

The vacuum jar illustrated in the drawings is of a common construction having a cylindrical outer casing 2 of sheet metal, a cover 4 screw-threaded on the upper end of the casing, a double wall glass lining 6 for the casing, the lining walls having a vacuum space between them, and a cork stopper 7 for the opening at the top of the lining.

As shown, the bottle holder comprises a receptacle 8 for cracked ice, and a rack 10 secured to the top of the receptacle for receiving the milk bottle 12 or similar article. The ice receptacle 8 is made of sheet metal and is provided with a cylindrical wall portion 14 and a bottom wall 16 both of which are provided with perforations 18, the top of the receptacle being open so as to enable ice to be placed therein. The lower end portion of the receptacle is reduced in diameter and flares outwardly, and an annular cushioning member 20 of rubber or other yielding material is fitted over said reduced portion of the receptacle, the lower edge of the cushioning member projecting beyond the bottom of the receptacle.

The bottle holding rack comprises four stays 24 of spring metal that are vertically arranged and have their lower ends secured by rivets 26 to the inside of the rim of the ice receptacle 8, the stays being equally spaced. Each pair of diametrically opposed stays 24 constitutes the vertical portions of a U-shaped strip, the horizontal portions 25 of the strips crossing each other and being secured together by a rivet 27. These horizontal portions 25 form the bottom of the rack 10 upon which the bottom of the bottle rests. The stays 24 are connected midway of their ends by an annular brace 28 which surrounds the stays and is secured thereto by rivets 30. The portion of each stay 24 projecting above the annular brace 28 is provided with a cushioning member 32 of rubber or other yielding material in the form of a sleeve which is slipped over the upper end of the stay.

The bottle holder is further provided with a U-shaped handle or bail 34 of spring metal having its horizontal portion extending across the top of the bottle and rack, and having its lower ends connected with the brace 28. The bail 34 is slidingly connected with the brace 28 in such a manner as to enable it to be extended or pulled upward so as to bring its horizontal top portion a sufficient distance above the top of the bottle to enable it to be conveniently grasped, when thus extended to enable it to be swung across the top of the rack so that the bottle may be easily removed and replaced in the rack, and when not in use, to be pushed down so as to bring its horizontal top portion close to the top of the bottle. As shown the connection between the ends of the arms of the bail and the brace 28 comprises outwardly projecting diametrically opposed straps 36 slitted in the brace and extruded, between which and the body of the brace the lower end portions of the arms of the bail loosely extend, said portion of each arm being reduced so as to provide upper and lower stop shoulders 38 and 40 for limiting the extent of the up and down movements, respectively, of the bail.

The bottle holder is of suitable size that when inserted in the vacuum jar it substantially fills the space between the bottom of the jar and the cork-stopper 7, the bottom cushioning member 20 engaging the bottom of the glass lining of the jar and the cushioning sleeves 32 engaging the cylindrical wall of the glass lining, so as to effectively hold the metal parts of the holder away from the glass lining. The resiliency of the upper portions of the stays 24 of the rack permit the cushioning sleeves 32 to tightly fit the glass lining of the jar.

As will be evident to those skilled in the art, my invention permits of various modifications without departing from the spirit thereof or the scope of the appended claims.

What I claim is:

1. A device for holding a bottle or similar article in a vacuum jar or similar container having, in combination, a receptacle provided with a bottom wall for containing and carrying ice for cooling the interior of said container, and a rack for receiving the article, the ice receptacle and rack being secured together so as to be removable as a unit from the container.

2. A device for holding a bottle or similar article in a vacuum jar or similar container having, in combination, a receptacle provided with a bottom wall for containing and carrying ice, and a rack for receiving said article projecting from the top of said receptacle said rack and receptacle being adapted to be removed from said container.

3. A device for holding a bottle or similar article in a vacuum jar or similar container having, in combination, a receptacle for ice having a base of yielding material adapted to rest upon the bottom of said container, and a rack for receiving said article projecting from the top of said receptacle and having its upper portion provided with members of yielding material spaced thereabout for engagement with the wall of said container.

4. A device for holding a bottle or similar article in a vacuum jar or similar container having, in combination, a receptacle for containing and carrying ice, a rack for receiving said article projecting from the top of said receptacle, and a U-shaped bail for carrying the device having its ends joined to said rack through a lost motion connection so as to enable it to be extended and retracted by a longitudinal movement.

5. A device for holding a bottle or similar article in a vacuum jar or similar container having, in combination, a receptacle for containing and carrying ice, a rack projecting from the top of said receptacle for receiving said article, and a U-shaped bail having its ends joined to opposite sides of said rack in such a manner as to enable it to be extended and retracted by a longitudinal movement and to enable its upper end to be swung a distance across the top of said rack.

6. A device for holding a bottle or similar article in a vacuum jar or similar container having, in combination, a receptacle for ice having its upper end open, and a rack for receiving said article, projecting from the top of said receptacle comprising a plurality of vertical stays having their lower ends secured to the rim of said container.

7. A device for holding a bottle or similar article in a vacuum jar or similar container having, in combination, a receptacle for ice, and a rack projecting from the top of said receptacle for receiving said article comprising stays vertically arranged and spaced apart having their lower ends secured to said container, and members of yielding material mounted on the upper portion of said stays for engaging the wall of said container.

8. A device for holding a bottle or similar article in a vacuum jar or similar receptacle having, in combination, a container for ice having its top end open and its wall provided with perforations, a cushioning member secured on the bottom of said receptacle for engagement with the bottom wall of said container, a rack for receiving said article comprising a plurality of stays or resilient material vertically arranged and spaced apart having their lower ends secured to the rim of said receptacle, an annular brace connecting said stays and located between their ends, cushioning members mounted on the upper portion of said stays for engagement with the wall of said container, and a U-shaped bail having its ends connected with said annular brace.

9. A device for holding a bottle or similar article in a vacuum jar or similar container having, in combination, a receptacle for containing and carrying ice having its upper end open, and having a bottom wall and a rack for receiving said article projecting from the upper end of said container and constructed so as to permit ice to be passed therethrough and into said receptacle, said rack and said receptacle being adapted to be removed from said container.

10. A device for holding a bottle or similar article in a vacuum jar or similar container having, in combination, a receptacle for containing and carrying ice having its upper end open and having a bottom wall, and a rack for receiving said article projecting from the upper end of said container and constructed so as to permit ice to be passed therethrough and into said receptacle, said rack and said receptacle being adapted to be removed from said container, and said rack being of skeleton form and the wall of said receptacle being provided with openings near its lower end.

GEORGE E. SAVAGE.
LOUIS H. WILKINSON.